United States Patent [19]

Capps

[11] Patent Number: 4,974,865
[45] Date of Patent: Dec. 4, 1990

[54] BOAT TRAILER WINCH MECHANISM

[76] Inventor: Lloyd O. Capps, Rte. 5, Box 338, Claremore, Okla. 74017

[21] Appl. No.: 369,955

[22] Filed: Jun. 22, 1989

[51] Int. Cl.⁵ .............................................. B60P 3/10
[52] U.S. Cl. ............................ 280/414.1; 280/47.331; 410/2; 410/68
[58] Field of Search ................ 280/414.1, 47.331, 656; 114/394; 410/2, 47, 49, 68; 414/529, 530, 531, 532, 533, 534, 535, 536; 182/92, 93

[56] References Cited

U.S. PATENT DOCUMENTS

| | | | |
|---|---|---|---|
| 3,022,090 | 2/1962 | Olney | 414/529 X |
| 3,175,710 | 3/1965 | Kistner | 414/534 |
| 3,984,121 | 10/1976 | Dobosi | 280/414.1 |
| 4,146,941 | 4/1979 | Haslam | 182/92 X |
| 4,626,162 | 12/1986 | Parisi | 280/414.1 X |
| 4,715,768 | 12/1987 | Capps | 414/535 |

*Primary Examiner*—Charles A. Marmor
*Assistant Examiner*—Mitchell Bompey

[57] ABSTRACT

An improved boat trailer winch mechanism that involves an adjustable triangular assembly comprising a first and second vertical support means attached to each other at the apex and to the tongue of a boat trailer forming the base. Extending rearwardly from the adjustable triangular assembly is a novel bow engaging mechanism capable of pivoting and adjusting such as to make contact on both sides of a boat hull. Cantilevered upward and forward from the triangular assembly is a third support member and manual winch with strap and hook closure. Preferably, the strap is directed downward to the tongue and selectively to the proper height through the rear structural member to the triangular assembly such as to insure proper tension when loading or transporting a boat on the boat trailer. Such a boat trailer winch allows the loading of a small pleasure craft onto a boat trailer without leaving the boat and risking getting wet in less time than previously known boat winches.

10 Claims, 5 Drawing Sheets

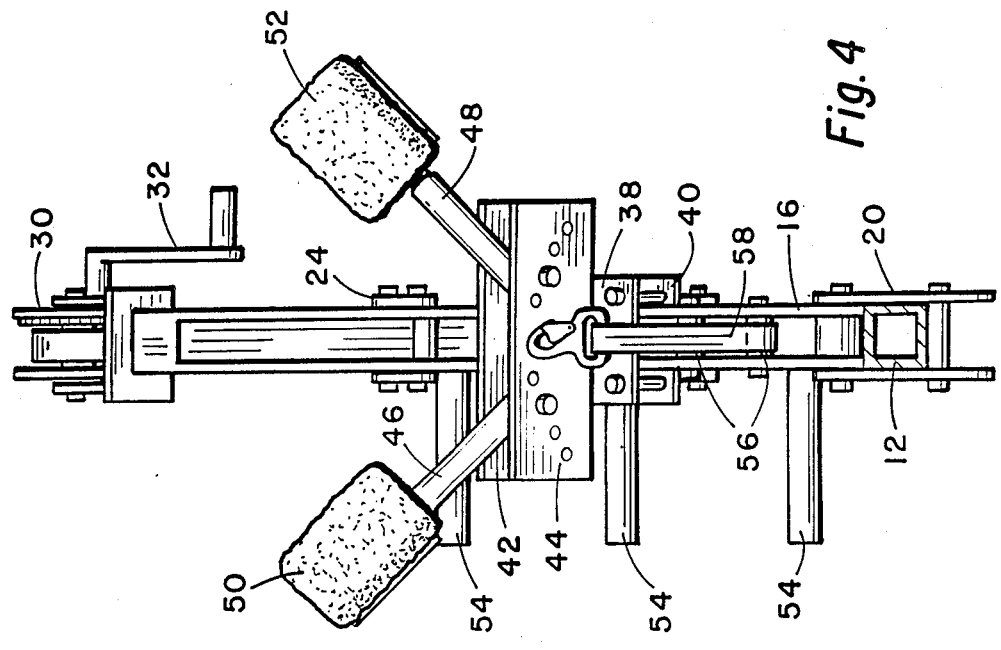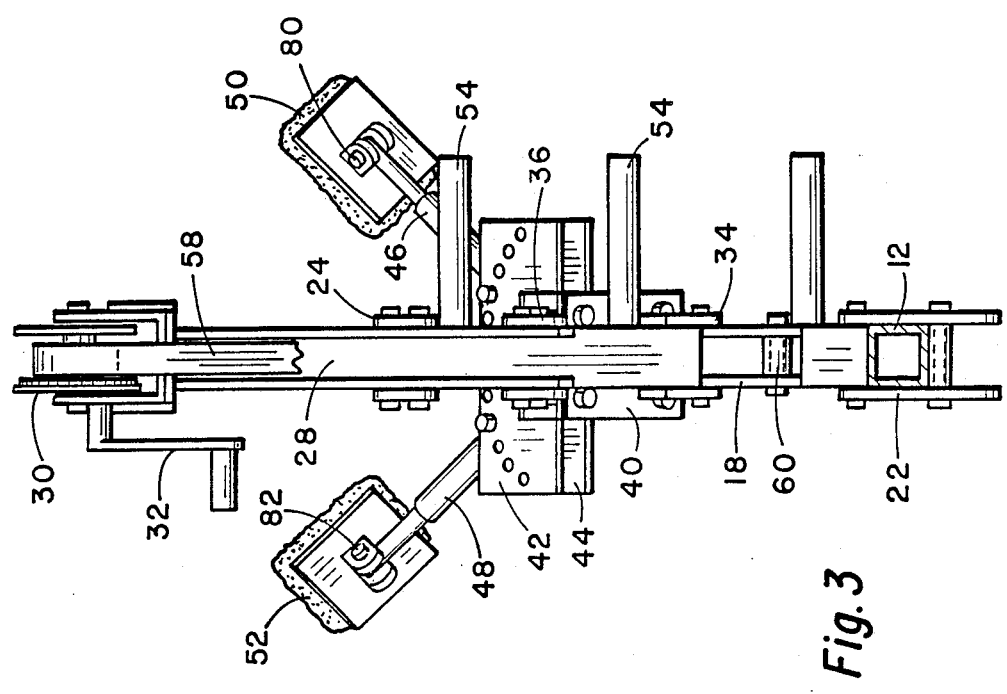

BOAT TRAILER WINCH MECHANISM

BACKGROUND OF THE INVENTION

1. Field of the Invention:

This invention relates to an improved boat trailer winch system for assisting in loading a pleasure boat onto a trailer. More specifically, the invention relates to an improved boat trailer winch that allows the operator of the boat to load the boat onto the trailer without standing in the water or even leaving the boat.

2. Description of the Prior Art:

It is generally known and a common practice when loading or unloading a small pleasure boat from a trailer to back the trailer into the water and then walk behind the towing vehicle such as to engage or disengage a winch strap from an eyelet on the bow of the boat. Customarily, the boat is then either manually pushed or floated off of the partially submerged trailer or, if being loaded, winched onto the trailer by virtue of a winch and cable or strap mounted to the front of the trailer. Invariably, these procedures result in the operator getting at least his or her feet wet. Frequently, this procedure is time consuming and requires considerable physical strength particularly if there is a natural current at the boat landing or dock.

SUMMARY OF THE INVENTION

In view of the problems associated with the prior art methods of loading small boats onto trailers, the present invention provides an improved boat trailer winch assembly that allows the boat operator to drive the boat onto the trailer and then winch the boat into a secure position on the trailer for transportation without leaving the boat or getting wet. Furthermore, the entire procedure of loading the boat onto the trailer can be routinely accomplished in terms of a few minutes or less, particularly when used in combination with a pair of boat trailer guides as disclosed in U.S. Pat. No. 4,715,768.

Thus, the present invention provides a boat trailer winch assembly comprising:

(a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;

(b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;

(c) a bow engaging means adjustably supported on the rearward portion of the triangular assembly formed by said first and second support means and tongue of a boat trailer for adjustably engaging a boat to be transported on a boat trailer;

(d) a third support means for adjustably attaching to the tongue of a boat trailer, to the second support means or to both such as to extend upwardly for supporting a winch assembly; and (e) a winch means attached to the top portion of said third support means for pulling a boat onto a boat trailer and retaining the boat on a boat trailer for transportation.

One particular embodiment of a boat trailer winch assembly of the present invention further comprising at least one roller means at the base of the third support means and at least one roller means in the first support means for accepting a cable or strap of the winch means around the roller means at the base of the third support means and around the roller means in the first support means such that the cable or strap can attach to a boat and pull the boat onto a boat trailer during loading.

It is an object of the present invention to provide a boat trailer winch that attaches to the tongue of a conventional boat trailer and will adjust to the shape of the bow of the boat such as to allow the operator of the boat to drive the boat onto the trailer while remaining on the boat. It is a further object of the present invention to provide a highly adjustable winch and winch cable system that allows the winch to be manually accessible from the bow of the boat with the winch cable being adjustable such as to apply tension in such a manner as to properly load the boat onto the trailer and hold the boat securely to the trailer once loaded. It is still a further object of the present invention to provide such a boat trailer winch assembly that significantly reduces the time required to load a boat. Fulfillment of these objects and the presence and fulfillment of other objects will be apparent upon complete reading of the specification and claims taken in conjunction with the drawings.

BRIEF DESCRIPTION OF THE DRAWINGS

FIG. 3 is a front view of the boat trailer winch assembly of FIG. 2 as seen through line III—III.

FIG. 4 is a rear view of the boat trailer winch assembly of FIG. 2 as seen through line IV—IV.

DESCRIPTION OF THE PREFERRED EMBODIMENTS

The improved boat trailer winch according to the present invention, how it attaches to a conventional boat trailer and how it functions and the advantages associated with its use can perhaps be best explained and understood by reference to the attached drawings.

Figure 1:
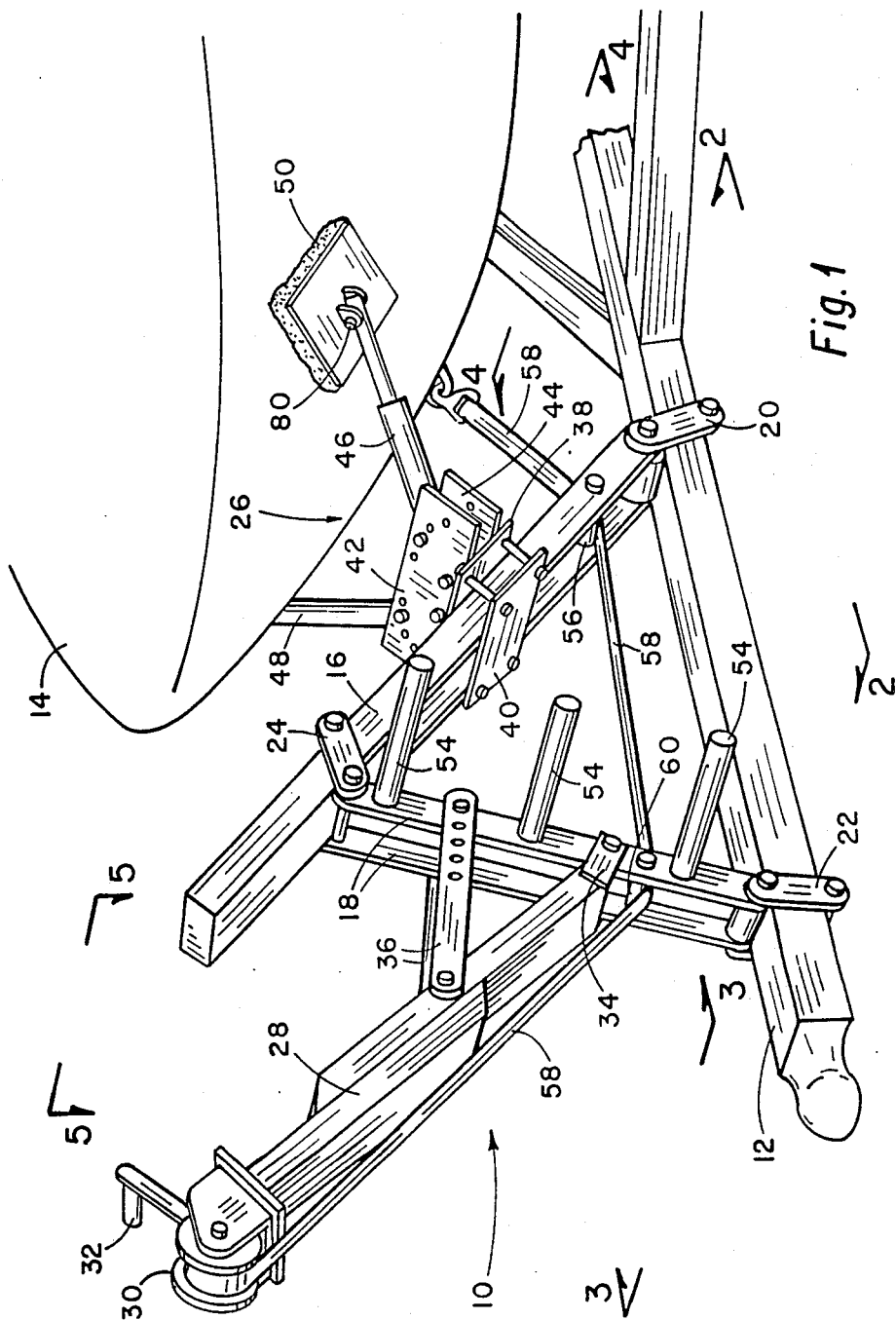
FIG. 1 is a perspective view of one preferred embodiment of the improved boat trailer winch assembly according to the present invention installed on a boat trailer with the bow of the boat being held under tension.
Figure 2:
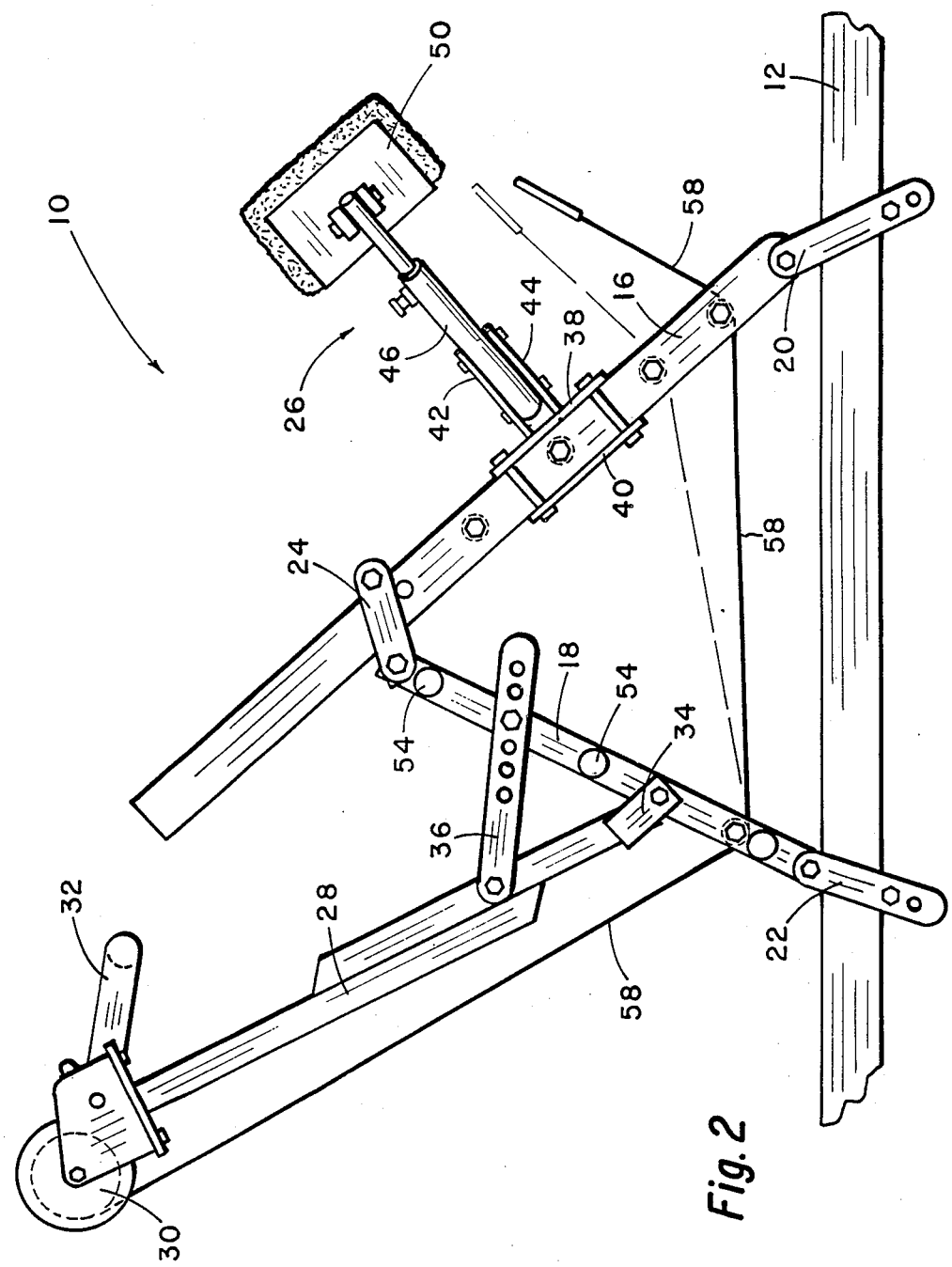
FIG. 2 is a side view of the boat trailer winch assembly of FIG. 1 as seen through line II—II.
Figure 5:
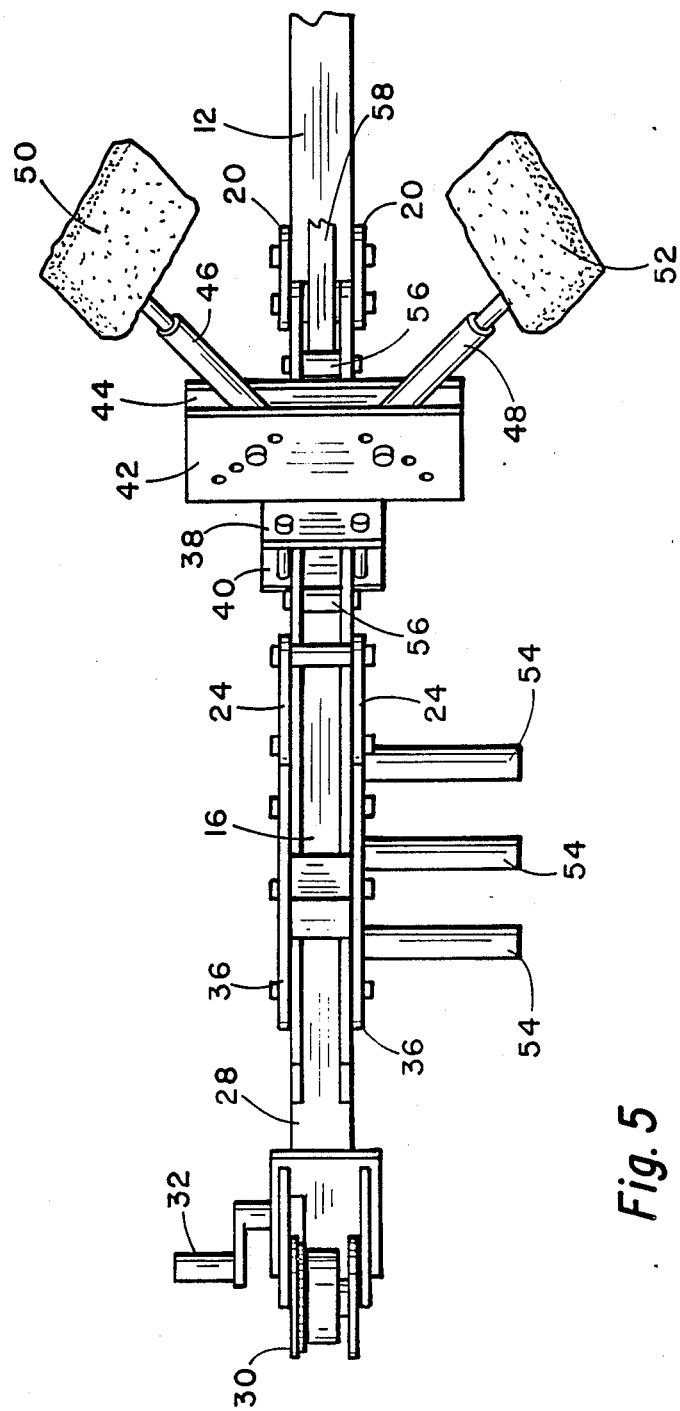
FIG. 5 is a top plan view of the boat trailer winch assembly of FIG. 2 as seen through line V—V.

FIG. 1 illustrates one preferred embodiment of the boat trailer winch according to the present invention generally designated by the numeral 10 installed on the tongue 12 of a conventional boat trailer and holding a boat 14. As illustrated, the trailer winch 10 involves a triangular assembly consisting of a first support member 16 and a second support member 18 forming the sides of the triangular assembly and attaching to each other at the apex of the triangle with the bottom end of support members 16 and 18 attaching to and resting on the tongue 12 of the boat trailer which represents the base of the triangle. Both lower ends of support members 16 and 18 are equipped with compression clamp mechanisms 20 and 22, respectively, that allow the entire trailer winch 10 to be adjustably positioned along the trailer tongue 12. Similarly, the apex of the triangle involves a third compression clamp 24 that allows the support member 18 to adjustably engage to support member 16 and thus alter the geometry of the triangle assembly such as to properly engage and support the bow of the boat. In other words, by adjusting the relative position of the clamping mechanisms at the corners of the triangular assembly, the bow engaging mechanism 26 can be properly positioned against both sides of the bow of the boat as more fully described later. It should be readily appreciated that other clamp mechanisms and/or fasteners as generally known in the art can be employed at the corners of the triangular assembly in order to facilitate the adjusting of the shape and position of the trailer winch on the boat trailer tongue and as such, should be considered equivalent for purposes of this invention.

As further illustrated in FIG. 1, cantilevered forward and upward from the second support member 18 is a third support member 28 which extends up to the top of the bow of the boat supporting a manual winch 30 such that the handle 32 of the winch 30 can be operated by a person in the boat. Similar to the triangular assembly, the bottom of the third support member 28 is equipped with a clamp mechanism 34 which allows the support member 28 to be adjustably positioned on the second support member 18. Brackets 36 are used to secure the third support member 28 at a desired angle and the support member 28 is telescopic in construction, thus allowing the winch handle 32 to be adjusted such as to be within reach from the interior of the boat.

FIG. 1 also illustrates the novel bow engaging means 26 according to the present invention. As illustrated, the first support member 16 extends upward and forward beyond the apex of the triangular assembly. Mounted to this extension is a base plate member 38 held in place by clamp 40. Projecting perpendicular to this plate member 38 are a pair of parallel surfaces 42 and 44 with telescopic concentric pipe segments 46 and 48 adjustably confined between these parallel surfaces. At the far end of each telescopic pipe segments 46 and 48 are a pair of cushioned flat contact members 50 and 52 that make contact with the bow of the boat. Also shown in FIG. 1 are a plurality of optional foot rungs or steps 54 that allow entry to and from the boat when the boat in on the trailer.

As shown in FIGS. 2 through 5, the improved trailer winch 10 of the present invention is a unit that can be assembled before installation to the control tongue member of a conventional boat trailer. The first support member 16 is preferably an open channel member containing a plurality of rollers 56 which make contact with the winch strap or cable 58 prior to being fastened to the boat bow eyelet (see FIG. 1). By use of a plurality of rollers 56 located at various relative heights, the angle of tension being applied at the boat eyelet can be selected to insure ease of loading the boat as well as securing the boat on the trailer during transportation. This strap or cable 58 is directed to the base of the second support member 18 before passing around a roller 60 located within support member 18 and is then directed upwards to the winch 30. It should be appreciated that other methods of routing the winch strap back towards the boat can be employed according to the present invention, but the preferred illustrated embodiment tends to optimize the direction and mechanical advantage without interfering with the overall operation of the trailer winch assembly. It should also be appreciated that the third support member 28, holding the winch at the level of the bow of the boat could also be supported directly to the trailer tongue and braced to the triangular assembly. In such a configuration, a roller at the base of the third support member would advantageously be employed to direct the winch strap back to the boat bow eyelet.

Figure 6:
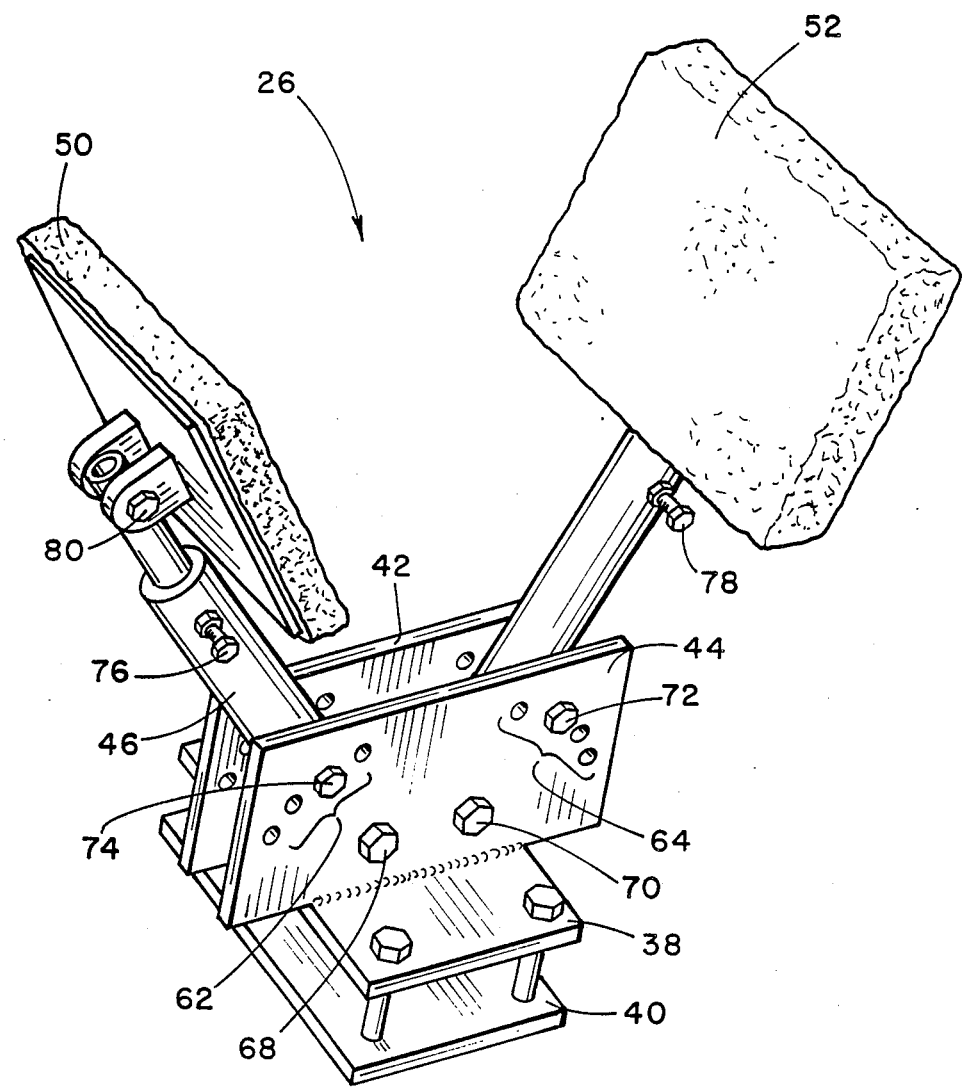
FIG. 6 is a close up view of the adjustable bow engaging mechanism or means according to the embodiment illustrated in FIG. 1.

FIG. 6 illustrates a close up perspective view of the novel bow engaging means 26 according to the present invention. As illustrated, the device comprises a base plate 38 that extends beyond the width of the support member to which it is held by bolts clamps 40. The pair of parallel flat plates 42 and 44 contain a plurality of holes wherein two centrally located holes with axles 68 and 70 therein act as attachment points for the concentric pipe segments 46 and 48. At a fixed radius from each of the axle holes 68 and 70 are a set of adjustment holes 62 and 64 fanned out on a radius of curvature that allows removable retaining pins 72 and 74 to hold the concentric pipe segments 46 and 48 at a desired angle when rotated about axles 68 and 70. In addition to this angular adjustment, the concentric pipe segments contain set screws 76 and 78 at their sleeved juncture such as to adjust the respective length of extension of each pair and their relative rotation about an imaginary center axis of rotation. At the outer end of each of the telescopic concentric pipe segments 46 and 48 are mounted a pair of cushioned flat contact surfaces 50 and 52 by use of pivot attachment bolts 80 and 82 (see FIG. 3).

Because of the combined adjustable angle between the concentric pipe segments, the adjustable extension ad rotation of the concentric pipe and the free pivoting motion of the flat cushioned surfaces, the bow engaging means according to the present invention can be readily positioned against virtually any conventional bow configuration and once so adjusted, will spontaneously guide that boat into proper alignment during loading onto the trailer.

To use the improved boat trailer winch according to the present invention, the boat operator, as well as any passengers, board the boat resting on the boat trailer while on the parking lot behind the tow vehicle. The vehicle driver then backs the trailer with boat and boat operator into the water. When the boat starts to float, the vehicle driver stops. The boat operator then starts the boat motor. With the boat motor idling, the engine is shifted into forward gear. The boat operator can then move to the bow of the boat and release the winch and remove the snap from the bow eyelet. The operator returns to the console and shifts into reverse, thus backing the boat off of the trailer between the boat trailer guides of U.S. Pat. No. 4,715,768. To load the boat back on the trailer, the boat is steered between the boat guides and driven at idle forward until engaged to the bow engaging means of the present invention. The boat operator can then go forward and engage the tow strap snap to the bow eyelet and crank the winch handle until the boat is held firmly to the trailer. The boat motor is then turned off and the tow vehicle pulls the boat, trailer and passengers up to the parking lot. Typically, the loading and unloading is routinely accomplished in less than two minutes.

The actual construction of the improved boat trailer winch of the present invention can be out of any material well known in the art. For example, but not by way of limitation, the structural members can be preferably manufactured out of steel, but other structural metal or even fiber reinforced plastics could readily be employed. The winch can be any such device as generally known in the art, including the preferred manual crank winch, but could also be an electrically or even fluid powered device. The winch cable and hook can be generally any such device, again as well known in the art, including steel cable, fabric strap or equivalent with a hook or similar fastener at the far end. The protective pads making contact with the boat hull or front of the boat can be generally any resilient material such as rubber, carpet covered wood or plastic or the like.

The advantages and benefits associated with the improved boat trailer winch according to the present invention are considered numerous and significant. First and foremost, the boat trailer winch allows the boat operator to load and unload the boat from a trailer in much less time than has previously been the case when using prior art winch mechanisms. In part and as a further advantage, the ease of and reduced time to load a boat onto the trailer is attributed to the fact that the boat operator does not have to leave the boat during loading. As such, the frequently encountered problems associated with getting wet by standing in the water associated with prior art boat trailer loading procedures is virtually eliminated. Experience indicates that when the boat trailer winch of the present invention is used in combination with trailer guides as described in U.S. Pat. No. 4,715,768, a boat can be loaded by one person in terms of a few minutes or less. Furthermore, the particular mechanical configuration of the trailer winch assembly and the adjustable bow engaging means of the present invention represent a highly versatile system compatible with most conventional boat hull configurations and contemporary boat trailers.

Having thus described the invention with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

I claim:

1. A boat trailer winch assembly comprising:
   (a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;
   (b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;
   (c) a bow engaging means adjustably supported on the rearward portion of the triangular assembly formed by said first and second support means and tongue of a boat trailer for adjustably engaging a boat to be transported on a boat trailer;
   (d) a third support means for adjustably attaching to the tongue of a boat trailer, to the second support means of to both such as to extend upwardly for supporting a winch assembly at the level accessible for manual operation from the deck of a boat when loaded on said boat trailer;
   (e) a winch means attached to a top portion of said third support means for pulling a boat onto a boat trailer and retaining the boat on a boat trailer for transportation; and
   (f) at least one roller means at the base of said second support means and at least one roller means in said first support means for accepting a cable or strap of said winch means around said roller means at the base of said second support means and around said roller means in said first support means such that said cable or strap can attach to a boat and pull the boat onto a boat trailer during loading.

2. A boat trailer winch assembly of claim 1 wherein said third support means is adjustable vertically such as to position said winch means near the height of a bow of a boat on a boat trailer.

3. A boat trailer winch assembly of claim 1 wherein said second support means further comprises a plurality of step means for climbing in or out of a boat.

4. A boat trailer winch assembly comprising:
   (a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;
   (b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;
   (c) a bow engaging means adjustably supported on the rearward portion of the triangular assembly formed by said first and second support means and tongue of a boat trailer for adjustably engaging a boat to be transported on a boat trailer;
   (d) a third support means for adjustably attaching to the tongue of a boat trailer, to the second support means of to both such as to extend upwardly for supporting a winch assembly at the level accessible for manual operation from the deck of a boat when loaded on said boat trailer;
   (e) a winch means attached to a top portion of said third support means for pulling a boat onto a boat trailer and retaining the boat on a boat trailer for transportation; and
   (f) at least one roller means at the base of said third support means and at least one roller means in said first support means for accepting a cable or strap of said winch means around said roller means at the base of said third support means and around said roller means in said first support means such that said cable or strap can attach to a boat and pull the boat onto a boat trailer during loading.

5. A boat trailer winch assembly of claim 4 wherein said third support means is adjustable vertically such as to position said winch means near the height of a bow of a boat on a boat trailer.

6. A boat trailer winch assembly of claim 4 wherein said second support means further comprises a plurality of step means for climbing in or out of a boat.

7. A boat trailer winch assembly comprising:
(a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;
(b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;
(c) a bow engaging means adjustably supported on the rearward portion of the triangular assembly formed by said first and second support means and tongue of a boat trailer for adjustably engaging a boat to be transported on a boat trailer;
(d) a third support means for adjustably attaching to the tongue of a boat trailer, to the second support means or to both such as to extend upwardly for supporting a winch assembly; and
(e) a winch means attached to the top portion of said third support means for pulling a boat onto a boat trailer and retaining the boat on a boat trailer for transportation;
wherein said bow engaging means further comprises:
(i) a base plate means with attachment means for retaining said base plate means to a boat winch assembly;
(ii) a first and second parallel flat plate attached to said base plate means and extending outwardly from said base plate means in a substantially parallel configuration wherein said first and second parallel flat plates contain a plurality of aligned holes passing therethrough including two separate pairs of aligned holes centrally located in said first and second parallel flat plates near the location of said attachment to said base plate means and two separate sets of pairs of aligned holes in said first and second parallel flat plates remote to the location of said attachment to said base plate means wherein each set of pairs of aligned holes are positioned along a radius of curvature relative to one or the other of said centrally located separate pairs of aligned holes being the center of rotation;
(iii) a first pair of concentrically sleeved pipe segments having a threaded st screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a first axle means passing through one of said separate pairs of aligned holes centrally located in said first and second parallel flat plates and through said pair of aligned holes at one end of said pipe segments and wherein said concentric sleeved pipe segments are held at a desired position by a first retaining pin means passing through one of said pairs of aligned holes of one of said separate sets of aligned holes in said first and second parallel flat plates remote to the location of said first axle means by a distance corresponding to said radius of curvature and said pair of aligned holes in said pipe segments displaced away from the hole in the end at a distance corresponding to said radius of curvature;
(iv) a second pair of concentrically sleeved pipe segments having a threaded set screw means at the sleeved junction between the concentric pipe segments for holding the pipe segments in a final desired configuration after the inner pipe segments is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a second axle means passing through one of said separate pairs of aligned holes centrally located in said first and second parallel flat plates and through said pair of aligned holes at one end of said pipe segments and wherein said concentric sleeved pipe segments are held at a desired position by a second retaining pin means passing through the other of said pair of aligned holes of the other of said separate sets of aligned holes in said first and second parallel flat plates remote to the location of said second axle means by a distance corresponding to said radius of curvature and said pair of aligned holes in said pipe segments displaced away from the hole in the end at a distance corresponding to said radius of curvature;
(v) a first substantially flat cushioned means pivotally attached to the outer end of said first pair of concentrically sleeved pipe segments for making contact with the bow of a boat; and
(vi) a second substantially flat cushioned means pivotally attached to the outer end of said second pair of concentrically sleeved pipe segments for making contact with the bow of a boat.

8. A boat trailer winch assembly comprising:
(a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;
(b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;

(c) a bow engaging means adjustably supported on the rearward portion of the triangular assembly formed by said first and second support means and tongue of a boat trailer for adjustably engaging a boat to be transported on a boat trailer;

(d) a third support means for adjustably attaching to the tongue of a boat trailer, to the second support means or to both such as to extend upwardly for supporting a winch assembly; and (e) a winch means attached to the top portion of said third support means for pulling a boat onto a boat trailer and retaining the boat on a boat trailer for transportation;

and further comprising at least one roller means at the base of said second support means and at least one roller means in said first support means for accepting a cable or strap of said winch means around said roller means at the base of said second support means and around said roller means in said first support means such that said cable or strap can attach to a boat and pull the boat onto a boat trailer during loading, wherein said bow engaging means further comprises:

(i) a base plate means with attachment means for retaining said base plate means to a boat winch assembly;

(ii) a first and second parallel flat plate attached to said base plate means and extending outwardly from said base plate means in a substantially parallel configuration wherein said first and second parallel flat plates contain a plurality of aligned holes passing therethrough including two separate pairs of aligned holes centrally located in said first and second parallel flat plates near the location of said attachment to said base plate means and two separate sets of pairs of aligned holes in said first and second parallel flat plates remote to the location of said attachment to said base plate means wherein each set of pairs of aligned holes are positioned along a radius of curvature relative to one or the other of said centrally located separate pairs of aligned holes being the center of rotation;

(iii) a first pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a first axle means passing through one of said separate pairs of aligned holes centrally located in said first and second parallel flat plates and through said pair of aligned holes at one end of said pipe segments and wherein said concentric sleeved pipe segments are held at a desired position by a first retaining pin means passing through one of said pairs of aligned holes of one of said separate sets of aligned holes in said first and second parallel flat plates remote to the location of said first axle means by a distance corresponding to said radius of curvature and said pair of aligned holes in said pipe segments displaced away from the hole in the end at a distance corresponding to said radius of curvature;

(iv) a second pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a second axle means passing through one of said separate pairs of aligned holes centrally located in said first and second parallel flat plates and through said pair of aligned holes at one end of said pipe segments and wherein said concentric sleeved pipe segments are held at a desired position by a second retaining pin means passing through the other of said pair of aligned holes of the other of said separate sets of aligned holes in said first and second parallel flat plates remote to the location of said second axle means by a distance corresponding to said radius of curvature and said pair of aligned holes in said pipe segments displaced away from the hole in the end at a distance corresponding to said radius of curvature;

(v) a first substantially flat cushioned means pivotally attached to the outer end of said first pair of concentrically sleeved pipe segments for making contact with the bow of a boat; and (vi) a second substantially flat cushioned means pivotally attached to the outer end of said second pair of concentrically sleeved pipe segments for making contact with the bow of a boat.

9. A boat trailer winch assembly comprising:

(a) a first support means for adjustably attaching at one end to a tongue of a boat trailer and for extending upwardly and towards the front of a boat trailer thus forming one vertical side of an adjustable triangular assembly above a boat trailer tongue, wherein the base of the triangular assembly is the boat trailer tongue;

(b) a second support means for adjustably attaching at one end to the tongue of a boat trailer and for extending upwardly and towards the rear of a boat trailer and for adjustably attaching to said first support means thus forming a second vertical side of an adjustable triangular assembly above a boat trailer tongue;

(c) a bow engaging means adjustably supported on the rearward portion of the triangular assembly formed by said first and second support mean and tongue of a boat trailer for adjustably engaging a boat to be transported on a boat trailer;

(d) a third support means for adjustably attaching to the tongue of a boat trailer, to the second support means or to both such as to extend upwardly for supporting a winch assembly; and (e) a winch means attached to the top portion of said third support means for pulling a boat onto a boat trailer and retaining the boat on a boat trailer for transportation;

and further comprising at least one roller means at the base of said third support means and at least one roller means in said first support means for accepting a cable or strap of said winch means around said roller means at the base of said third support means and around said roller means in said first support means such that said cable or strap can attach to a boat and pull the boat onto a boat trailer during loading, wherein said bow engaging means further comprises:

(i) a base plate means with attachment means for retaining said base plate means to a boat winch assembly;

(ii) a first and second parallel flat plate attached to said base plate means and extending outwardly from said base plate means in a substantially parallel configuration wherein said first and second parallel flat plates contain a plurality of aligned holes passing therethrough including two separate pairs of aligned holes centrally located in said first and second parallel flat plates near the location of said attachment to said base plate means and two separate sets of pairs of aligned holes in said first and second parallel flat plates remote to the location of said attachment to said base plate means wherein each set of pairs of aligned holes are positioned along a radius of curvature relative to one or the other of said centrally located separate pairs of aligned holes being the center of rotation;

(iii) a first pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a first axle means passing through one of said separate pairs of aligned holes centrally located in said first and second parallel flat plates and through said pair of aligned holes at one end of said pipe segments and wherein said concentric sleeved pipe segments are held at a desired position by a first retaining pin means passing through one of said pairs of aligned holes of one of said separate sets of aligned holes in said first and second parallel flat plates remote to the location of said first axle means by a distance corresponding to said radius of curvature and said pair of aligned holes in said pipe segments displaced away from the hole in the end at a distance corresponding to said radius of curvature;

(iv) a second pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a second axle means passing through one of said separate pairs of aligned holes centrally located in said first and second parallel flat plates and through said pair of aligned holes at one end of said pipe segments and wherein said concentric sleeved pipe segments are held at a desired position by a second retaining pin means passing through the other of said pair of aligned holes of the other of said separate sets of aligned holes in said first and second parallel flat plates remote to the location of said second axle means by a distance corresponding to said radius of curvature and said pair of aligned holes in said pipe segments displaced away from the hole in the end at a distance corresponding to said radius of curvature;

(v) a first substantially flat cushioned means pivotally attached to the outer end of said first pair of concentrically sleeved pipe segments for making contact with the bow of a boat; and (vi) a second substantially flat cushioned means pivotally attached to the outer end of said second pair of concentrically sleeved pipe segments for making contact with the bow of a boat.

10. An adjustable boat bow engaging assembly comprising:

(a) a base plate means with attachment means for retaining said base plate means to a boat winch assembly;

(b) a first and second parallel flat plate attached to said base plate means and extending outwardly from said base plate means in a substantially parallel configuration wherein said first and second parallel flat plates contain a plurality of aligned holes passing therethrough including two separate pairs of aligned holes centrally located in said first and second parallel flat plates near the location of said attachment to said base plate means and two separate sets of pairs of aligned holes in said first and second parallel flat plates remote to the location of said attachment to said base plate means wherein each set of pairs of aligned holes are positioned along a radius of curvature relative to one or the other of said centrally located separate pairs of aligned holes being the center of rotation;

(c) a first pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a first axle means passing through one of said separate pairs of aligned holes centrally located in said first and second parallel flat plates and through said pair of aligned holes at one end of said pipe segments and wherein said concentric sleeved pipe segments are held at a desired position by a first retaining pin means passing through one of said pairs of aligned holes of one of said separate sets of aligned holes in said first and second parallel flat plates remote to the location of said first axle means by a distance corresponding to said radius of curvature and said pair of aligned holes in said pipe segments displaced away from the hole in the end at a distance corresponding to said radius of curvature;

(d) a second pair of concentrically sleeved pipe segments having a threaded set screw means at the sleeved junction between the concentric pipe segments for holding the pipe segments in a final desired configuration after the inner pipe segment is adjustably extended and rotated within the outer pipe segment to a desired configuration and wherein one end of one of said pipe segments contains a pair of aligned holes and a pair of aligned holes displaced away from the hole in the end at a distance corresponding to said radius of curvature and wherein said concentric sleeved pipe segments are positioned between said first and second parallel plates and pivotally attached by a second axle means passing through one of said separate pairs of aligned holes centrally located in said first and second parallel flat plates and through said pair of aligned holes at one end of said pipe segments and wherein said concentric sleeved pipe segments are held at a desired position by a second retaining pin means passing through the other of said pair of aligned holes of the other of said separate sets of aligned holes in said first and second parallel flat plates remote to the location of said second axle means by a distance corresponding to said radius of curvature and said pair of aligned holes in said pipe segments displaced away from the hole in the end at a distance corresponding to said radius of curvature;

(e) a first substantially flat cushioned means pivotally attached to the outer end of said first pair of concentrically sleeved pipe segments for making contact with the bow of a boat; and (f) a second substantially flat cushioned means pivotally attached to the outer end of said second pair of concentrically sleeved pipe segments for making contact with the bow of a boat.

* * * * *